United States Patent [19]
Nakajima et al.

[11] Patent Number: 5,659,791
[45] Date of Patent: Aug. 19, 1997

[54] ENCAPSULATION OF EXTRACTED PORTIONS OF DOCUMENTS INTO OBJECTS

[75] Inventors: Satoshi Nakajima, Bellevue; Mark A. Malamud, Seattle; Royce A. Levien, Bellevue, all of Wash.

[73] Assignee: Microsoft Corporation, Redmond, Wash.

[21] Appl. No.: 53,051

[22] Filed: Apr. 26, 1993

[51] Int. Cl.$^6$ .................................................. G06F 3/00
[52] U.S. Cl. ...................... 395/802; 395/348; 395/761
[58] Field of Search ........................... 395/145, 146, 395/159, 161, 348, 802, 761

[56] References Cited

U.S. PATENT DOCUMENTS

| | | | |
|---|---|---|---|
| 5,321,423 | 6/1994 | Yoshizawa et al. | 395/145 X |
| 5,324,120 | 6/1994 | Kataoka | 395/145 X |

FOREIGN PATENT DOCUMENTS 0 312 480  4/1989  European Pat. Off. .

OTHER PUBLICATIONS

George R. Beinhorn (Using Professional Write for Window), 1991, pp. 85–89.

Welch, Kevin P. and David E. West, "*Extending the Functions of the Windows Clipboard with Scrapbook+,*" Microsoft Systems Journal, vol. 3, No. 6, Nov. 1988, pp. 73–80.

*Primary Examiner*—Phu K. Nguyen
*Assistant Examiner*—Cliff N. Vo
*Attorney, Agent, or Firm*—Seed and Berry LLP

[57] ABSTRACT

An operating system provides support for the encapsulation of extracted portions of documents into objects known as scrap objects and subsequently integrated into other documents. The scrap objects may be treated like any other file system objects. The scrap objects provide a persistent storage mechanism for extracted portions of documents that are transferred between applications. Scrap object may be created using either a clipboard mechanism or a drag-and-drop mechanism.

18 Claims, 3 Drawing Sheets

"THE DOG ATE MY..."
(SCRAP 1)

ENCAPSULATION OF EXTRACTED PORTIONS OF DOCUMENTS INTO OBJECTS

TECHNICAL FIELD

The present invention relates generally to data processing systems and, more particularly, to storage of extracted portions of documents as objects within data processing systems.

BACKGROUND OF THE INVENTION

The Microsoft Windows, Version 3.1, operating system, sold by Microsoft Corporation of Redmond, Wash., provides a clipboard program for transferring selected information between applications. The clipboard temporarily holds the selected information as it is transferred from one application to another. In general, the clipboard is activated by a user selecting a "Copy" or a "Cut" command. These commands store a block of text, a graphic image or some other kind of information on the clipboard. Subsequently, the user selects a "Paste" command to transfer the information from the clipboard to the destination application. The clipboard retains its correct contents until the user replaces the contents or explicitly requests that the contents of the clipboard be deleted. The lack of persistency of the information stored in the clipboard poses a problem. Users often inadvertently delete the contents of the clipboard by transferring other information to the clipboard.

SUMMARY OF THE INVENTION

In accordance with a first aspect of the present invention, a method is practiced in a data processing system. The data processing system includes a video display and at least one processor that runs an object-oriented operating system. The data processing system also includes a memory for storing objects. In this method, a portion of a document is displayed on the video display. Information to be extracted from the displayed portion of the document is selected and extracted. The selected information is encapsulated into an object that is stored in the memory. The selected information may be text, graphics or other kinds of data that are permitted in the document. The method may include the additional step of displaying an icon for the object holding the selected information.

In accordance with another aspect of the present invention, a method is practiced wherein at least a portion of a document is displayed on a video display. Information to be extracted from the document is selected. The selected information is dragged using a pointing device, such as a mouse, to a drop target, whereupon the selected information is dropped. The selected information is then encapsulated into a separate object that is stored in memory.

In accordance with yet another aspect of the present invention, a method is practiced wherein at least a portion of a document is displayed on a video display. Information in the document is selected to be extracted from the document and then transferred to a clipboard provided in the operating system. The selected information is transferred from the clipboard to an application that encapsulates the information into a separate object that is stored in memory.

BRIEF DESCRIPTION OF THE DRAWINGS

A preferred embodiment to the present invention will be described with reference to the drawings, which include the following figures.

DETAILED DESCRIPTION OF THE INVENTION

The preferred embodiment of the present invention supports the encapsulation of extracted portions of documents into objects known as "scrap objects." Each scrap object can be manipulated like any other file system object. A scrap object may originate as text, a cell, a figure or any other information found in a document. A scrap may be created by either a drag-and-drop mechanism or by a clipboard mechanism. These mechanisms will be described in more detail below. The scrap object may subsequently be integrated into a destination document and provides a vehicle for transferring portions of documents between applications.

The scrap object provides a vehicle for interapplication transfer of information in a non-modal fashion such that other transfer operations may be performed without completing a first transfer operation. A machine may even be rebooted before the first transfer operation is completed. The scrap objects persistently hold information extracted from documents until the information is to be transferred into another document. Moreover, the scrap object allows transfers between application programs that support different transfer mechanisms. For instance, a first application that supports only drag and drop operations may transfer information via a scrap object to a second application program that supports only clipboard transfer operations.

Figure 1:
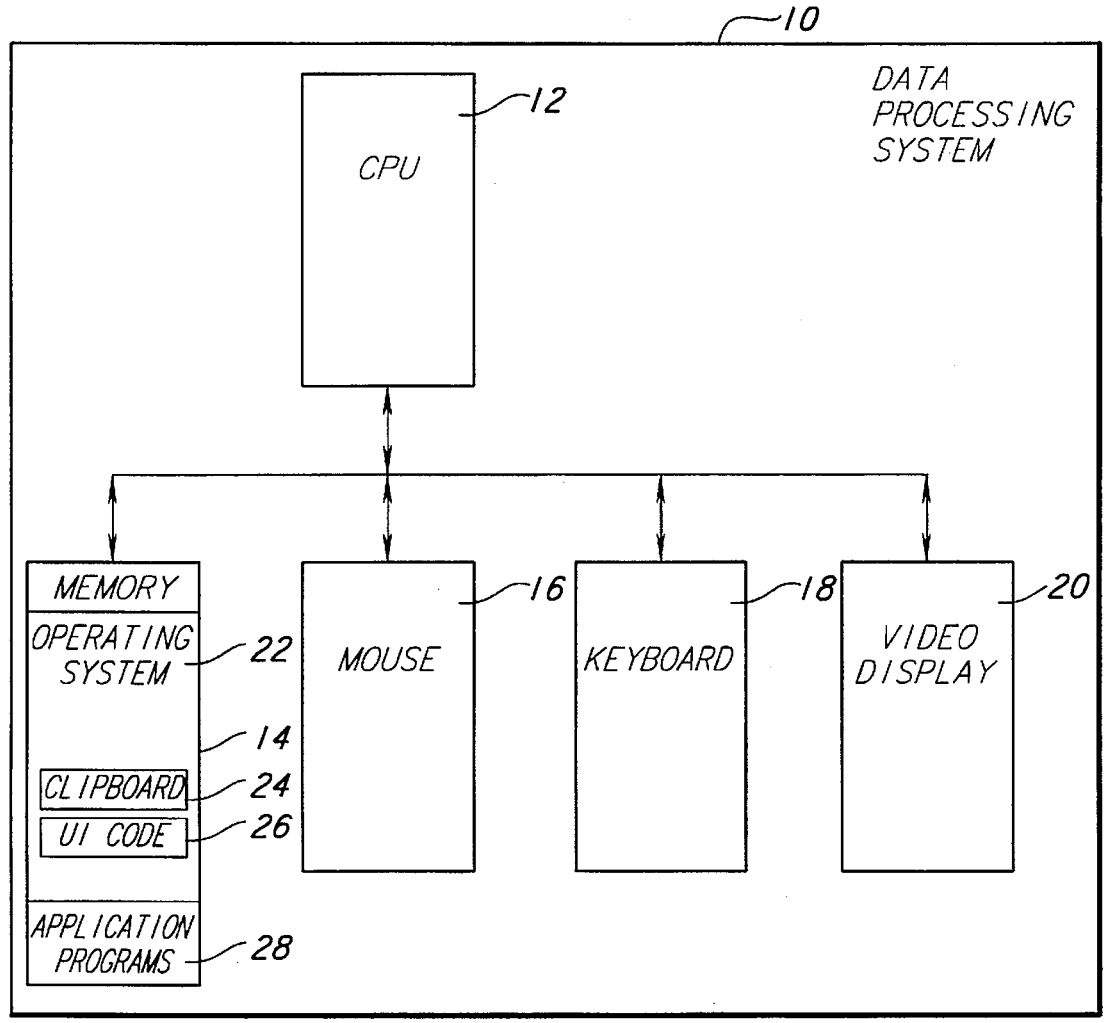
FIG. 1 is a block diagram of a data processing system suitable for implementing the preferred embodiment of the present invention.

FIG. 1 is a block diagram depicting a data processing system 10 that is suitable for practicing the preferred embodiment of the present invention. The data processing system 10 includes a central processing unit (CPU) 12, a memory 14, a mouse 16, a keyboard 18 and a video display 20. The memory 14 includes random access memory (RAM), as well as disk memory. The memory 14 may also include other kinds of storage. The memory 14 holds a copy of an object-oriented operating system 22 and copies of application programs 28. Those skilled in the art will, nevertheless, appreciate that the present invention is not limited to the use of an object-oriented operating system. Other types of operating systems may instead be used with the present invention. The operating system 22 provides code for a clipboard 24 and code 26 for implementing a user interface (UI).

Given that the operating system 22 is an object-oriented operating system, a number of object-oriented concepts are used within the preferred embodiment of the present invention. For example, the concept of an "object" is employed within the preferred embodiment. An object encapsulates both behavior and attributes. An object is a combination of data structures that hold attributes data and functions that act upon the attributes data.

A "class" of objects refers to a group of objects with similar attributes and functions. In the preferred embodiment of the present invention, a special scraps class of objects is provided. Each scrap object in the preferred embodiment of the present invention constitutes a separate instance of an object of the scraps object class. Thus, all scrap objects belong to the scraps object class and have the same types of attributes and functions. The values of these attributes and functions may vary between separate instances of objects in the class. Each scrap object holds information that has been extracted from a document in one or more clipboard formats.

Another concept employed in the object-oriented operating system 22 of the preferred embodiment is the notion of an "interface". An interface is a set of semantically-related functions that are composed into a named unit. The interface does not provide code for implementing the functions that are included in it, and all of the functions in the interface are virtual functions (such as found in the C++ programming language). An object is said to "support" an interface if the object provides code for implementing the functions contained within the interface. Multiple objects may support an interface, wherein each object provides a separate set of code for practicing the functions of the interface.

The mouse 16 plays an important role in the drag-and-drop mechanism used to create a scrap object. Thus, in order to understand the drag-and-drop mechanism, it is helpful to review how the mouse 16 interacts with other system components. The mouse 16 includes a roller that allows the mouse to be rolled across a flat surface. The movement of the mouse is generally translated into a corresponding movement of a graphic element (such as a cursor) on the video display 20. The mouse 16 also includes at least one button which may be depressed and released. The movement of the mouse 16, the depression of the mouse button and the release of the mouse button each constitutes an event that is translated by the operating system 22 into a message. The operating system 22 posts most of these mouse messages into a message queue for a currently executing application program 28. The application program 28 may generate several different windows. Each window has a window procedure associated with it. The movement of the mouse 16 causes movement of a cursor on the video display 20. When the cursor enters a particular window, a message is generally placed into the message queue and is forwarded to the window procedure that is associated with that window. The drop message, however, is directly sent to the window procedure and not into the queue. The mouse message specifies the position of the mouse 16 within the window and the status of the mouse buttons (i.e., depressed or released).

Figure 2:
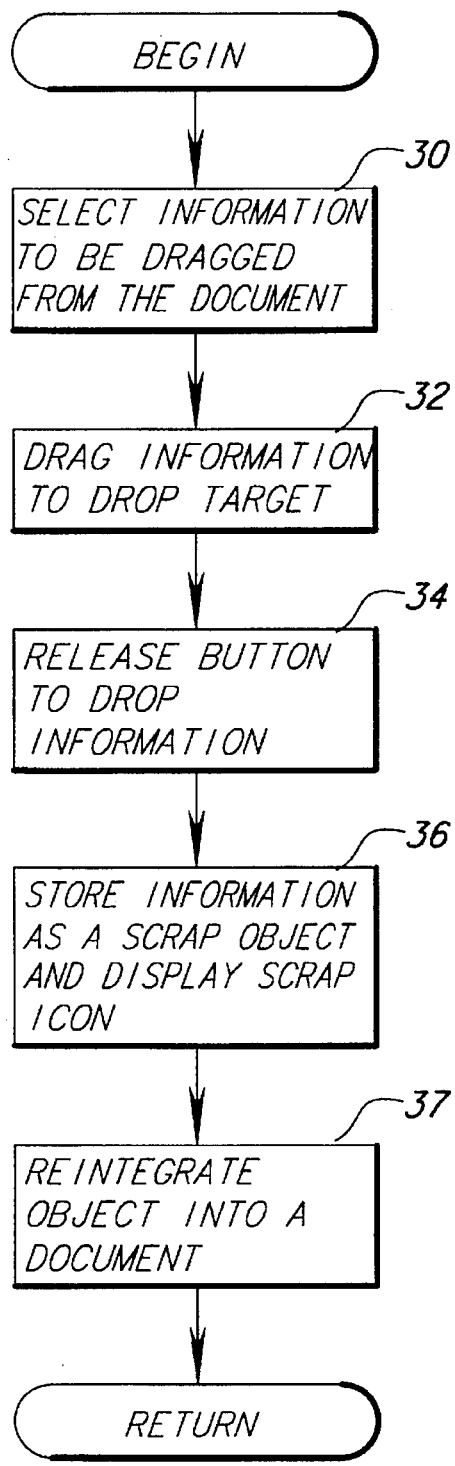
FIG. 2 is a flowchart illustrating the step performed to create a scrap object using the drag-and-drop mechanism of the preferred embodiment of the present invention.
Figure 3:
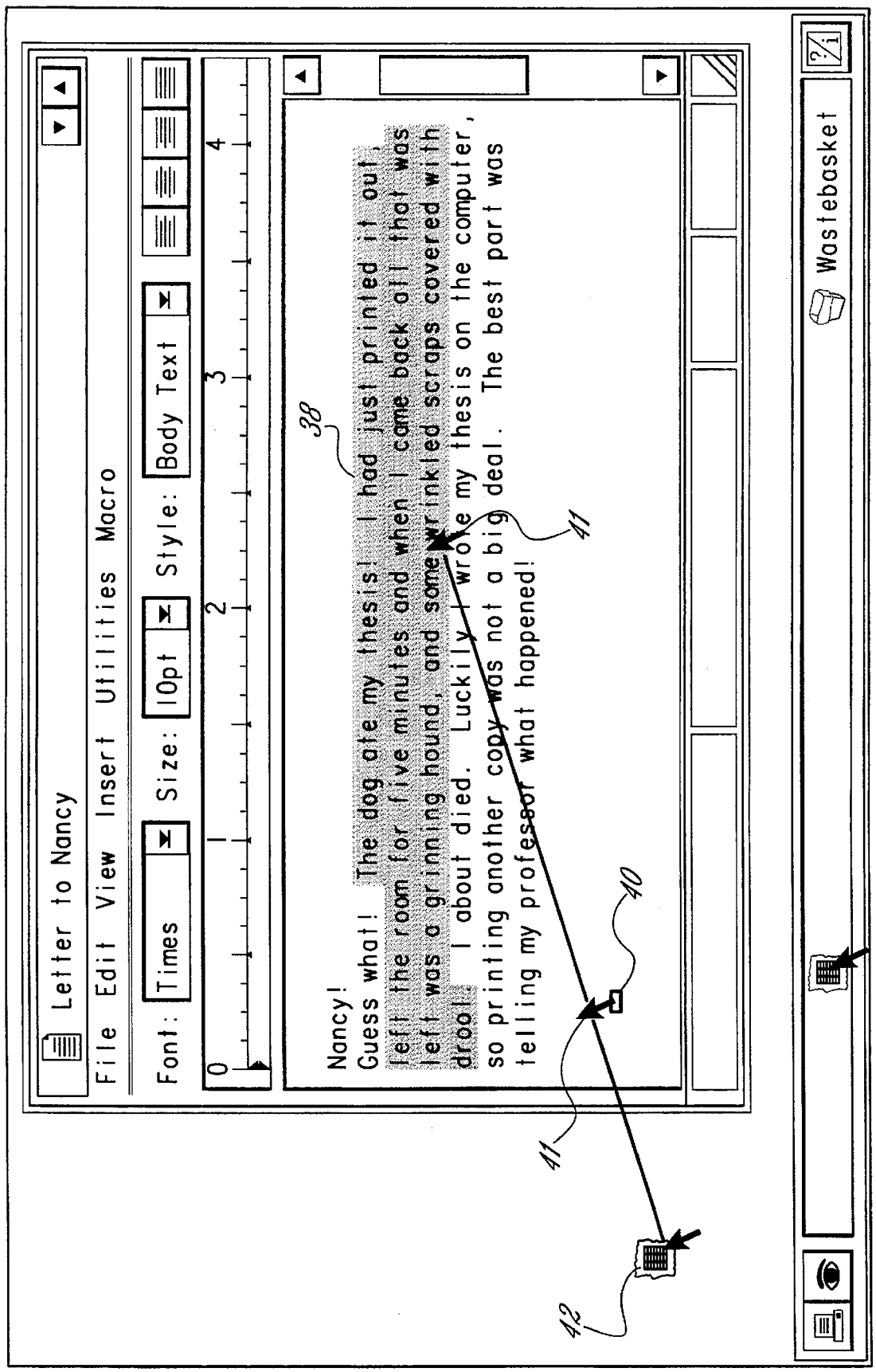
FIG. 3 is a diagram illustrating the appearance of the video display of FIG. 1 during the creation of a scrap object using the drag-and-drop mechanism.

FIG. 2 is a flowchart illustrating the steps that are performed to create and use a scrap object via the drag-and-drop mechanism. A user selects information to be dragged from the document (step 30 in FIG. 2). The application program 28 (FIG. 1) that is currently executing provides a mechanism for selecting information to be dragged from the document. In the example of FIG. 3, the application that is executing is the Microsoft Word word-processing program, which is sold by Microsoft Corporation of Redmond, Wash. The information to be dragged out of the document is text, which is in the highlighted area 38. The cursor 41 points to the highlighted area 38 at the initiation of the drag-and-drop operation. The selected information is then dragged to a drop target using the mouse 16 (step 32 in FIG. 2). A drag is performed by positioning the cursor over the selected information and holding the mouse button down while moving the mouse 16. The application program 28 is informed by message that the cursor is positioned over the highlighted area 28. In addition, the application program 28 is also informed by a message that the mouse button is depressed and that the mouse 16 is moving. In response to these mouse messages, the application program 28 calls the DoDragDrop( ) function (specified by the Microsoft OLE 2.0 protocol) to initiate the drag-and-drop operation.

As the selected information is dragged across the window displaying the document, a phantom icon 40 moves in conjunction with the cursor 41 (See FIG. 3). The phantom icon 40 displays a portion of the information that is being dragged out of the document. In the example of FIG. 3, the phantom icon 40 is a dotted box holding the first few words of the extracted text. The operating system 22 is responsible for tracking the mouse movements during the drag portion of the drag-and-drop operation. When the cursor 41 is positioned over the drop target, the mouse button is released to drop the selected information onto the target (step 34 in FIG. 2). The application program associated with the drop target receives a message that the cursor and the extracted information are positioned over the drop target. The DragOver( ) function is called to determine if the drop target is a valid drop target. The drop target may be the desktop or any other object that has registered as a drop target. An application program registers as a drop target by calling the RegisterDragDrop( ) function (such as provided in the Microsoft OLE 2.0 protocol) in the operating system 22. The drop target is added to a list of possible drop targets. The DragOver( ) function consults this list to determine whether a proposed drop target is a valid drop target.

After the drop, the application program associated with the drop target is responsible for storing the extracted information in a scrap object (i.e., creating the scrap object) and asking the operating system 22 to display an icon for the scrap object (step 36 in FIG. 2). The DoDragDrop( ) function, mentioned above, acts as a loop that returns when the drag-and-drop operation is completed. One of the parameters that must be passed to this function when it is called is a pointer to the data object that holds the data to be dropped. In the example of FIG. 3, the data object is the document from which the extracted text was taken. In creating the scrap object, the application associated with the drop target takes the extracted data from the data object and stores the data in a stream (i.e., a contiguous array of bytes). The stream is a persistent form of storage, unlike the conventional clipboard. The data is stored in the stream by calling a function (i.e., the Save( ) function) in the IPersistStream interface (such as included in the Microsoft OLE 2.0 protocol). Thus, in the example of FIG. 3, the desktop program is an object that supports the IPersistStream interface. In addition, the desktop sends feedback to the source object indicating whether the drop was successful and the type of operation that was performed after the drop. After the scrap object is created, it may be subsequently integrated into a document, including the document from which it originated (step 37 in FIG. 2).

Figure 4:
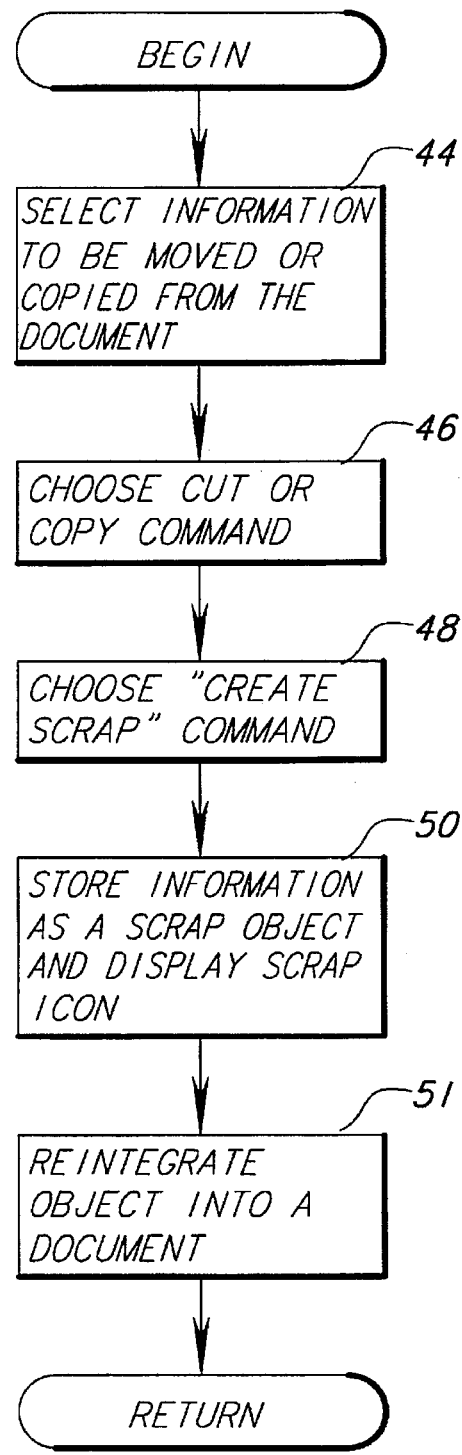
FIG. 4 is a flowchart illustrating the steps performed to create a scrap object using a clipboard mechanism of the preferred embodiment of the present invention.

A scrap object may also be created using the clipboard 24 (FIG. 1). As discussed above, the clipboard is a mechanism that allows transfer of information from one application to another. The clipboard 24 is a series of functions in the operating system 22 that facilitate the exchange of memory blocks between application programs 28. The clipboard works primarily by altering memory allocation flags of global memory blocks in memory 14. To create a scrap object using the clipboard 22, the steps shown in the flowchart of FIG. 4 are executed. Initially, the information is selected to be moved or copied from the document (step 44).

The user then selects the "Cut" command or the "Copy" command depending upon whether the user wishes to have the information moved or copied, respectively, from the document (step 46 in FIG. 3). The user switches to the application (if necessary) where the user wishes to add the extracted information and chooses the "Create Scrap" command (step 48). For instance, in the example shown in FIG. 3, the user wishes to have the information copied or moved to the desktop, and the "Create Scrap" command is used to create a scrap object on the desktop. The information is then stored as a scrap object, and an icon for the scrap object is displayed on the desktop (step 50). The steps performed at the desktop to create the scrap object and generate an icon are like those described above for the drag-and-drop mechanism. The scrap object may then subsequently be reintegrated into a document (including the document from which it originated) (step 51).

Figure 5:
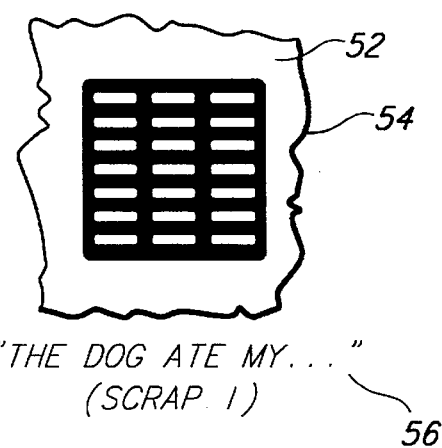
FIG. 5 is a diagram of a scrap icon generated in accordance with the preferred embodiment of the present invention.

Regardless of how a scrap object is created, each scrap object has an icon 52 (FIG. 5) and a name 56. The icon 52 and name 56 are shown in FIG. 5 for the example illustrated in FIG. 3. The icon 52 includes a special rough-edged border 54 that designates the object as a scrap object. For long file name systems (i.e., operating systems that support file names of greater than 11 characters), the format for the name of the scrap object is:

<name>+"(scrap"[+" "+<n>]+")".

The <name> portion of the scrap name holds the first few full words of the extracted information, which may be up to 15 characters in length. For the example case shown in FIG. 5, the first few words are "The dog ate my . . . " The remainder of the name of the scrap object includes the word "Scrap" and a blank or a number specifying the number of the scrap object encapsulated in parentheses. The number is utilized in the scrap object name to delineate scrap objects that otherwise share the same name. In the example of FIG. 5, the scrap object is the first scrap object and thus the phrase "(Scrap 1)" follows the name portion of the scrap object name.

In short file name systems (those which support a maximum file name length of 11 characters, such as found in the 8.3 FAT-based systems), the name is designated as SCRAP-nnn.SCR. The "nnn" portion of the scrap object name is a three digit number that is automatically assigned by the operating system for the scrap. SCR is the extension that is assigned to scrap objects.

Scrap objects are designed to be extracted from one document and reintegrated back into another document or even another document. The extracted portion of the document that is encapsulated into a scrap object should be reintegrated into a document seamlessly as much as possible so that it reassumes its original appearance when reintegrated.

The applications in which the scrap objects are reintegrated must be programmed to recognize the type of information read in the scrap object and handle reintegration accordingly. As mentioned above, the extracted information held in a scrap is stored in one of the clipboard formats. There are three distinct situations in which reintegration must be realized. First, when an icon of a document that is embedded in another document is dragged out of the document and into a folder, it should remain as an icon of a document. When it is dragged into the document, it should look just like it did when it was dragged out of the document (i.e., it should appear as an icon of a document). Second, when a scrap object is not native to the document in which it is embedded (i.e., it is not the same type), the extracted information appears as a scrap object in the embedded document, but must appear in its original form when reintegrated back into the document from which it originated. Third, when the extracted information held in a scrap is a native part of a document in which it is embedded, the information should regain its original appearance.

While the present invention has been described with reference to a preferred embodiment thereof, those skilled in the art will nevertheless appreciate the varied changes in detail and form that may be made without departing from the present invention as defined in the appended claims.

We claim:

1. In a data processing system having a video display, a memory holding objects and at least one processor for running an operating system, a method comprising the computer-implemented steps of:

(a) displaying a portion of a document on the video display;

(b) selecting information to be extracted from the portion of the document that is displayed on the video display;

(c) extracting the selected information from the document;

(d) encapsulating the selected information into an object that was created automatically by the system to encapsulate the selected information in response to the extracting and that is stored in the memory; and (e) displaying the icon for the object holding the selected information on the video display.

2. The method of claim 1 wherein the data processing system includes an input device and wherein the selecting is performed in response to a user using the input device.

3. The method of claim 1 wherein the data processing system includes an input device and wherein the extracting is performed in response to a user using the input device.

4. The method of claim 1 wherein the data processing system runs an application program that displays a window on the video display such that the portion of the document is displayed in the window on the video display and wherein the icon for the object holding the selected information is displayed outside of the window on the video display.

5. The method of claim 1 wherein the icon is displayed on a virtual desktop.

6. The method of claim 1 wherein the icon has an appearance that indicates that the selected information was extracted from a document.

7. In a data processing system having a video display, a memory holding objects and at least one processor for running an operating system that provides a name space for the objects in the memory, a method comprising the computer-implemented steps of:

(a) displaying a portion of a document on the video display;

(b) selecting information to be extracted from the portion of the document that is displayed on the video display;

(c) extracting the selected information from the document;

(d) encapsulating the selected information into an object that was created automatically by the system to encapsulate the selected information in response to the extracting and that is stored in the memory; and (e) giving the object a name for referencing the object wherein the name is visible in the name space provided by the operating system and is descriptive of the selected information.

8. In a data processing system having a pointing device, a video display, a memory and at least one processor running an operating system, a method comprising the computer-implemented steps of:

(a) displaying at least a portion of a document on the video display;

(b) selecting information in the document to be extracted from the document;

(c) in response to a user using the pointing device, dragging the selected information to a drop target;

(d) in response to a user using the pointing device, dropping the selected information at the drop target;

(e) in response to the dropping of the selected information at the drop target, encapsulating the selected information into a separate object that was automatically created by the system to encapsulate the selected information and that is stored in the memory; and (f) displaying an icon for the object holding the selected information from the document on the video display.

9. The method of claim 8 wherein the processor runs an application program that displays an application program window on the video display and wherein the document is displayed in the application window and the icon is displayed outside the application program window.

10. The method of claim 8 wherein the icon has an appearance that indicates that the selected information was extracted from a document.

11. In a data processing system having a pointing device, a memory and at least one processor running an object-oriented operating system, a method comprising the steps of:

(a) displaying at least a portion of a document on the video display;

(b) selecting information in the document to be extracted from the document;

(c) using the pointing device to drag the selected information to a drop target;

(d) using the pointing device to drop the selected information at the drop target;

(e) encapsulating the selected information into a separate object that was automatically created by the system in response to the drop that is stored in the memory; and (f) giving the object a name for referencing the object wherein the name is descriptive of the selected information.

12. The method of claim 11 wherein the icon has an appearance that indicates that the selected information was extracted from a document.

13. A computer-readable storage medium for use in a data processing system having a video display, a memory holding objects and at least one processor for running an operating system, said medium holding:

an extraction component for extracting selected information from a document that is displayed on the video display;

an encapsulation component for encapsulating the selected information that has been extracted by the extraction component into an object that was automatically created by the system in response to the extraction component to encapsulate the selected information and that is stored in the memory; and a display component for displaying an icon for the object that holds the selected information.

14. The computer-readable storage medium of claim 13 wherein the icon has an appearance that indicates that the object encapsulates information that has been extracted from a document.

15. A computer-readable storage medium for use in a data processing system having a video display, a memory holding objects and at least one processor for running an operating system, said medium holding:

an extraction component for extracting selected information from a document that is displayed on the video display;

an encapsulation component for encapsulating the selected information that has been extracted by the extraction component into an object that was automatically created by the system to encapsulate the selected information in response to the extracting by the extraction component and that is stored in the memory; and a naming component for adding a name for the object into a name space of objects that is provided by the operating system, the name for the object is descriptive of the selected information.

16. A computer-readable storage medium for use in a computer system that has a video display, a pointing input device, a memory and at least one processor running an operating system, said medium holding:

a scrap object creator for automatically creating a scrap object that encapsulates selected information in response to when the selected information has been dragged and dropped from a document displayed in a window at a location outside of the window in response to a user using the input pointing device; and an icon display generator for displaying an icon for a scrap object where the selected information was dropped.

17. The computer-readable storage medium of claim 16 wherein the icon for the scrap object has an appearance that indicates that it is a scrap object.

18. The computer-readable storage medium of claim 16 further holding a name generator for assigning a name to the scrap object that is descriptive of the selected information and that is visible in a name space provided by the operating system.

* * * * *